United States Patent
Burette et al.

(10) Patent No.: US 12,247,178 B2
(45) Date of Patent: Mar. 11, 2025

(54) LUBRICATION OF RECHARGEABLE HYBRID VEHICLE ENGINE AND HYBRID VEHICLE COMPRISING A RANGE EXTENDER

(71) Applicant: TotalEnergies OneTech, Courbevoie (FR)

(72) Inventors: Gautier Burette, Solaize (FR); Mickael Debord, Solaize (FR); David Senard, Solaize (FR)

(73) Assignee: TotalEnergies OneTech, Courbevoie (FR)

( * ) Notice: Subject to any disclaimer, the term of this patent is extended or adjusted under 35 U.S.C. 154(b) by 0 days.

(21) Appl. No.: 18/285,040

(22) PCT Filed: Mar. 30, 2022

(86) PCT No.: PCT/EP2022/058431
§ 371 (c)(1),
(2) Date: Sep. 29, 2023

(87) PCT Pub. No.: WO2022/207715
PCT Pub. Date: Oct. 6, 2022

(65) Prior Publication Data
US 2024/0191153 A1  Jun. 13, 2024

(30) Foreign Application Priority Data
Mar. 30, 2021 (FR) .................... 21 03252

(51) Int. Cl.
*C10M 169/04* (2006.01)
*C10M 135/18* (2006.01)
(Continued)

(52) U.S. Cl.
CPC ........ *C10M 169/04* (2013.01); *C10M 135/18* (2013.01); *C10M 2203/003* (2013.01);
(Continued)

(58) Field of Classification Search
CPC .............. C10M 169/04; C10M 135/18; C10M 2203/003; C10M 2219/068; C10M 171/02;
(Continued)

(56) References Cited

U.S. PATENT DOCUMENTS

2006/0211581 A1* 9/2006 Bullock, Jr. ......... C10M 169/04
208/19
2008/0110797 A1* 5/2008 Fyfe ..................... C10M 101/02
208/18
(Continued)

FOREIGN PATENT DOCUMENTS

EP  3 666 862 A1  6/2020

OTHER PUBLICATIONS

Rapport De Recherche Internationale issued in International Patent Application No. PCT/EP2022/058431 dated Jul. 11, 2022.
(Continued)

*Primary Examiner* — Ellen M McAvoy
(74) *Attorney, Agent, or Firm* — Troutman Pepper Locke LLP

(57) ABSTRACT

The application concerns the use of a lubricant composition of grade 0W-8 according to the SAEJ300 classification, comprising at least one base oil, from 1 to 1000 ppm of at least one friction modifying additive and from 0.1 to 10% by weight of at least one polymer improving the viscosity index, said lubricant composition having kinematic viscosity measured at 40° C. according to standard ASTM D445 lower than or equal to 20 mm2/s, kinematic viscosity measured at 100° C. according to standard ASTM D445 lower than 5 mm2/s, and Noack volatility measured at 250° C. according to standard CEC-L-40-A-93 of between 10 and 85%, preferably between 25 and 85%, more preferably between 60 and 85%, for the lubrication of a rechargeable hybrid vehicle
(Continued)

engine or a hybrid vehicle engine comprising a range extender.

18 Claims, 1 Drawing Sheet

(51) Int. Cl.
   *C10N 20/02* (2006.01)
   *C10N 30/00* (2006.01)
   *C10N 30/02* (2006.01)
   *C10N 30/04* (2006.01)
   *C10N 40/00* (2006.01)
   *C10N 40/25* (2006.01)

(52) U.S. Cl.
   CPC ... *C10M 2219/068* (2013.01); *C10N 2020/02* (2013.01); *C10N 2030/02* (2013.01); *C10N 2030/04* (2013.01); *C10N 2030/54* (2020.05); *C10N 2030/74* (2020.05); *C10N 2040/25* (2013.01); *C10N 2040/40* (2020.05)

(58) Field of Classification Search
   CPC ............ C10N 2020/02; C10N 2030/02; C10N 2030/04; C10N 2030/54; C10N 2030/74; C10N 2040/25; C10N 2040/40; C10N 2030/06; C10N 2040/255; Y02T 10/62
   See application file for complete search history.

(56) References Cited

U.S. PATENT DOCUMENTS

| | | | |
|---|---|---|---|
| 2012/0012076 A1* | 1/2012 | Atkinson | C10M 169/04 123/1 A |
| 2018/0258365 A1* | 9/2018 | Ohkubo | C10M 169/048 |
| 2018/0258366 A1* | 9/2018 | Ohkubo | C10M 169/04 |
| 2018/0371348 A1* | 12/2018 | Oumar-Mahamat | C10M 105/04 |
| 2019/0002784 A1* | 1/2019 | Boffa | C10M 145/14 |
| 2020/0102519 A1* | 4/2020 | Oumar-Mahamat | C10M 105/04 |
| 2020/0181527 A1* | 6/2020 | Kulmala | B01J 35/633 |
| 2020/0277542 A1* | 9/2020 | Salvi | C10M 169/04 |
| 2022/0380696 A1* | 12/2022 | Hogendoorn | C10M 129/00 |
| 2023/0167378 A1* | 6/2023 | Boffa | C10M 137/10 508/374 |

OTHER PUBLICATIONS

Rapport De Recherche Préliminaire issued in French Patent Application No. 2103252 dated Nov. 17, 2021.

Anonymous "Motul Hybrid 0W8" Motul Technical Data Sheet, 2 pages (2020) cited in ISR and FR SR submitted herewith.

Zhmud, B., "Viscosity matters" Lube Magazine Online, 4 pages (2019) cited in ISR and FR SR submitted herewith.

\* cited by examiner

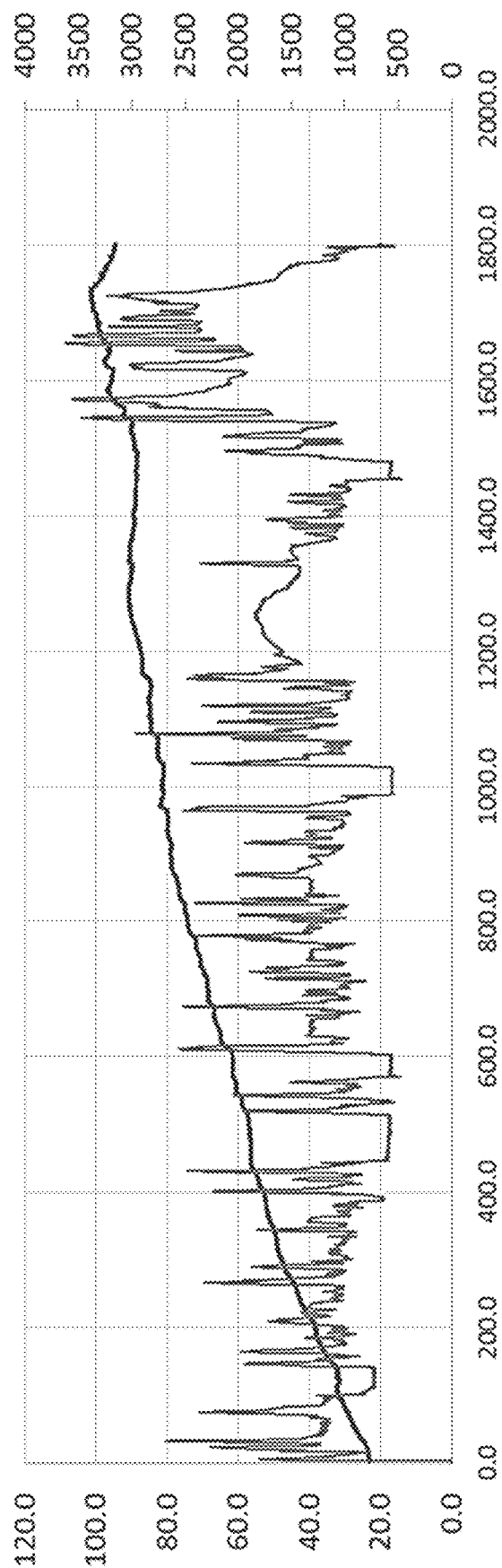

LUBRICATION OF RECHARGEABLE HYBRID VEHICLE ENGINE AND HYBRID VEHICLE COMPRISING A RANGE EXTENDER

CROSS REFERENCE TO RELATED APPLICATIONS

The present application is a U.S. National Phase Application under 35 U.S.C. § 371 of International Patent Application No. PCT/EP2022/058431 filed Mar. 30, 2022, which claims priority of French Patent Application No. 21 03252 filed Mar. 30, 2021. The entire contents of which are hereby incorporated by reference.

FIELD OF THE INVENTION

The present invention concerns the lubrication of a hybrid vehicle engine of rechargeable hybrid vehicle type and of a hybrid vehicle comprising a range extender.

BACKGROUND

Hybrid vehicles have two power sources, an internal combustion engine and an electric motor. In most hybrid vehicles, the internal combustion engine drives the wheels and is seconded by an electric motor. A battery provides the electricity needed for functioning of the electric motor, this battery in conventional hybrid vehicles being recharged during braking and deceleration phases by a kinetic energy recovery system (KERS) integrated in the vehicle.

There exist different technologies for hybrid vehicles. Among these hybrid technologies, particular mention can be made of:
- micro-hybrid vehicles (also called light hybridization), these vehicles equipped with the «stop&start» system recover the energy generated by braking to charge a battery which can give momentary assistance to the internal combustion engine;
- mild-hybrid vehicles which comprise electric assistance during accelerations;
- full-hybrid vehicles are vehicles having complete hybridization. At low speed, when the battery is charged, the electric motor takes in charge startup and motive power. At high speed, or when the battery is discharged, the internal combustion engine takes over when there is a need for increased power (for example for acceleration) and the two power sources operate together. It is therefore possible to drive with the internal combustion engine shut off for a few kilometres.

Other complementary technologies have recently been developed: rechargeable hybrid vehicles and hybrid vehicles comprising a range extender. Rechargeable hybrid vehicles (also called plug-in vehicles) comprise an internal combustion engine and an electric motor, the battery can be recharged on the electricity network, these vehicles can therefore be driven in 100% electric mode over a distance of several tens of kilometres, for example 50 kilometres. In hybrid vehicles comprising a range extender, only the electric motor drives the wheels. This electric motor is powered by a battery for several tens of kilometres. When the battery reaches a certain charge threshold (e.g. approximately 30%) the internal combustion engine starts up and drives a current generator allowing the necessary electricity to be produced for recharging the battery and maintaining operation of the electric motor.

In these two types of hybrid vehicles, the internal combustion engine is used less often and therefore operates at lower temperatures (in the region of and even lower than 40° C.) than the engines of other types of hybrid vehicles. However, at low temperature, conventional lubricant compositions are more viscous and the additives are not active as in a conventional application at a higher temperature Current lubricants have been optimized to obtain a gain in fuel consumption when engines are hot.

There is therefore a need to provide a specific lubricant composition allowing the lubrication of said motorization systems and in particular at lower temperatures.

SUMMARY

It is one objective of the present invention to provide a lubricant composition allowing the lubrication of an engine of a rechargeable hybrid vehicle or comprising a range extender.

A further objective of the present application is to provide said lubricant composition allowing use at low operating temperatures and in particular lower than 40° C.

These objectives are met with the present application which concerns the use of a grade 0W-8 lubricant composition, according to the SAEJ300 classification, comprising at least one base oil, from 0.01 to 10% by weight of at least one friction modifying additive, and from 0.1 to 10% by weight of at least one viscosity index (VI) improver, said lubricant composition having kinematic viscosity measured at 40° C. (KV40) lower than or equal to 20 mm$^2$/s, kinematic viscosity measured at 100° C. (KV100) lower than or equal to 5 mm$^2$/s, and Noack volatility measured at 250° C. of between 10 and 85%, preferably between 25 and 85%, more preferably between 60 and 85%, for the lubrication of a rechargeable hybrid vehicle engine or a hybrid vehicle engine comprising a range extender.

Preferably, the base oil (or mixture of base oils if there are several base oils) has a KV100 of between 1 and 4 mm$^2$/s, preferably between 2 and 3.5 mm$^2$/s.

The KV100 viscosity of the base oil is also known as the Base Oil Viscosity—BOV.

If there is a mixture of base oils, the KV100 of the base oil mixture (vM) is calculated as follows, for example for a mixture of 2 base oils:

$$v_M = 10^{10^{[x\%_{BO\,1} \cdot \log \log(v_{BO\,1}+1) + x\%_{BO\,2} \cdot \log \log(v_{BO\,2}+1)]}} - 1$$

where:
x %$_{BO\,1}$, % base oil 1
x %$_{BO\,2}$, % base oil 2
v$_{BO\,1}$, viscosity of mixture 1
v$_{BO\,2}$, viscosity of mixture 2
v$_M$, viscosity of the mixture
the same equation can be used and extrapolated for a mixture of n base oils.

Preferably, the composition of the invention comprises at least one dispersing agent. Said dispersants ensure the maintaining in suspension and evacuation of insoluble solid contaminants of secondary oxidation products which are formed when the lubricant composition is in service. They can be selected from among Mannich bases, succinimides and derivatives thereof, such as the derivatives of polyisobutylene succinic anhydride, polyolefin amide alkeneamine polyol.

Preferably, the composition of the invention comprises between 0.5 and 4.5% by weight of dispersant, preferably between 1 and 2.5% by weight of dispersant relative to the total weight of the lubricant composition.

KV40 and KV100 are measured according to standard ASTM D445. Preferably, the KV40 of the composition of the invention is lower than or equal to 20, preferably between 10 and 20 mm$^2$/s, preferably between 11 and 15 mm$^2$/s. Preferably, the KV100 of the composition of the invention is between 1 and 5 mm$^2$/s, preferably between 2.5 and 5 mm$^2$/s.

Noack volatility at 250° C. is measured according to the CEC L-40-A-93 method. Preferably, the Noack volatility at 250° C. of the lubricant composition of the invention is between 10 and 85%, preferably between 25 and 85%, more preferably between 60 and 85%.

Preferably, the lubricant composition comprises from 50 to 95% by weight of base oil, preferably 70 to 90% by weight relative to the total weight of the lubricant composition.

Preferably, the lubricant composition may also comprise at least one additive improving the viscosity index (VI). Viscosity index improvers, in particular polymers improving the viscosity index, can guarantee good cold start properties and minimum viscosity at high temperature. As examples of polymers improving the viscosity index, mention can be made of polymer esters, the hydrogenated or non-hydrogenated homopolymers or copolymers of styrene, butadiene and isoprene, the homopolymers or copolymers of olefin such as ethylene or propylene, polyacrylates and polymethacrylates (PMAs), preferably the homopolymers, polymethacrylates or copolymers of olefin such as ethylene or propylene.

In particular, a lubricant composition of the invention may comprise from 1 to 15% by weight of additive(s) improving the viscosity index, preferably from 5 to 10% by weight, relative to the total weight of the lubricant composition.

Preferably, the lubricant composition of the invention comprises at least one friction modifying additive. Friction modifying additives allow friction to be limited by forming monolayers adsorbed on the surfaces of contacting metal surfaces. They can be selected from among compounds providing metal elements and ash-free compounds. Among compounds providing metal elements, mention can be made of complexes of transition metals such as Mo, Sb. Sn, Fe, Cu, Zn the ligands thereof possibly being hydrocarbon compounds comprising atoms of oxygen, nitrogen, sulfur or phosphorus. Ash-free friction modifying additives are generally of organic origin and can be selected from among the esters of fatty acids and polyols, differing from the monoester required in the invention, alkoxylated amines, alkoxylated fatty amines, fatty epoxides, borate fatty epoxides, fatty amines or fatty acid glycerol esters. In the invention, the fatty compounds comprise at least one hydrocarbon group having 10 to 24 carbon atoms. In particular, the molybdenum-based compounds can be selected from among molybdenum dithiocarbamates (Mo-DTC), molybdenum dithiophosphates (Mo-DTP), and mixtures thereof. Advantageously, the lubricant composition of the invention can comprise from 0.01 to 10% by weight, or from 0.01 to 5% by weight, more preferably from 0.01 to 2% by weight, further preferably from 0.1 to 1.5% by weight or 0.1 to 2% by weight of friction modifying additive relative to the total weight of the lubricant composition.

The Molybdenum (Mo) in the lubricant composition of the invention is provided by an organomolybdenum compound, in particular a compound selected from among a dithiocarbamate derivative of molybdenum (MoDTC), a dithiophosphate derivative of molybdenum (MoDTP) or a sulfur-free molybdenum complex, preferably a dithiocarbamate derivative of molybdenum (MoDTC).

Molybdenum dithiocarbamate compounds (MoDTC compounds) are complexes formed of a metallic core linked to one of more ligands selected independently from among alkyl dithiocarbamate groups. The MoDTC compound of the compositions used in the invention may comprise from 0.01 to 5%, preferably from 0.1 to 1.5% by weight of molybdenum relative to the total weight of the MoDTC compound.

Preferably, the composition of the invention comprises a molybdenum-based friction modifying additive, and preferably comprises (active content) from 1 to 1000 ppm Mo, preferably from 400 to 600 ppm relative to the weight of the lubricant composition.

In the present invention, by rechargeable hybrid vehicle (also called plug-in hybrid) it is meant a vehicle comprising an internal combustion engine and an electric motor, the battery can be recharged on the electricity network, this vehicle can therefore be driven in 100% electric mode over a distance of several tens of kilometres, for example for 50 kilometres.

In the present invention, by hybrid vehicle comprising a range extender, it is meant a hybrid vehicle in which only the electric motor drives the wheels. This electric motor is powered by a battery over several tens of kilometres. When the battery reaches a certain charge threshold (for example of approximately 30%), the internal combustion engine starts up and drives a current generator allowing the necessary electricity to be produced to recharge the battery and maintain the operating of the electric motor.

In particularly advantageous manner, the use of the lubricant composition of the invention allows a decrease in consumption to be obtained, for rechargeable hybrid vehicles or those comprising a range extender, that is much higher than in other hybrid motorization systems.

The use of the composition of the invention also affords a greater gain in Fuel Economy (FE) as demonstrated on vehicles of Range Extender and Plug-In Hybrid type, compared with a conventional lubricant.

The base oils used in the lubricant compositions of the invention can be oils of mineral or synthetic origin, optionally regenerated, belonging to Groups I to V in the classes defined by the API classification (or the equivalents thereof in the ATIEL classification) (Table A), or mixtures thereof.

TABLE 1

| | Saturates content | Sulfur content | Viscosity Index (VI) |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydro-isomerized oils | ≥90% | ≤0.03% | ≥120 |
| Group IV | Polyalphaolefins (PAO) | | |
| Group V | Esters and other bases not included in Groups I to IV | | |

The mineral base oils of the invention include all types of bases obtained by atmospheric and vacuum distillation of crude oil, followed by refining operations such as solvent extraction, deasphalting, solvent dewaxing, hydrotreatment, hydrocracking, hydroisomerization and hydrofinishing.

Mixtures of synthetic and mineral oils, optionally regenerated, can also be used.

There is generally no limit as to the use of different lubricant bases to prepare the lubricant composition of the invention, other than they must have properties and in particular of viscosity, viscosity index, sulfur content, oxidation resistance, adapted for use in vehicle engines or transmissions.

The base oils of the lubricant composition of the invention can also be selected from among synthetic oils such as some esters of carboxylic acids and alcohols, and from among polyalphaolefins. The polyalphaolefins used as base oils are obtained for example from monomers having 4 to 32 carbon atoms, for example from octene or decene and having viscosity at 100° C. of between 1.5 and 15 $mm^2 \cdot s^{-1}$ according to standard ASTM D445. The average molecular weight thereof is generally between 250 and 3 000 according to standard ASTM D5296.

The lubricant composition of the invention may comprise at least 50% by weight of base oils relative to the total weight of the composition. More advantageously, the lubricant composition of the invention comprises at least 60% by weight, even at least 70% by weight of base oils relative to the total weight of the composition. More particularly advantageously, the lubricant composition of the invention comprises from 75 to 95% by weight of base oils relative to the total weight of the composition.

The invention also provides a lubricant composition for vehicle engines, comprising at least one lubricant composition of the invention, at least one base oil and at least one additive.

Numerous additives can be used for this lubricant composition of the invention.

The preferred additives for the lubricant composition of the invention are selected from among detergent additives, anti-wear additives, extreme pressure additives, pour point improvers, defoaming agents, thickeners, and mixtures thereof.

Preferably, the lubricant composition of the invention comprises at least one anti-wear additive, at least one extreme pressure additive or mixtures thereof.

Anti-wear additives and extreme pressure additives protect rubbing surfaces by forming a protective film that is adsorbed on these surfaces.

There is a wide variety of anti-wear additives. Preferably, for the lubricant composition of the invention, the anti-wear additives are selected from among phospho-sulfurized additives such as metal alkylthiophosphates, in particular zinc alkylthiophosphates, and more specifically zinc dialkyldithiophosphates or ZnDTPs. The preferred compounds have the formula $Zn((SP(S)(OR)(OR'))_2$ where R and R', the same or different, are each independently an alkyl group, preferably an alkyl group having 1 to 18 carbon atoms.

Amine phosphates are also anti-wear additives that can be employed in the lubricant composition of the invention. However, the phosphorus contributed by these additives may act as poison for the catalytic systems of motor vehicles since these additives generate ash. These effects can be minimized by partially substituting the amine phosphates by additives not contributing phosphorus such as polysulfides for example and in particular sulfur-containing olefins.

Advantageously, the lubricant composition of the invention may comprise from 0.01 to 6% by weight, preferably from 0.05 to 4% by weight, and more preferably from 0.1 to 2% by weight of antiwear additives and extreme pressure additives, relative to the total weight of the lubricant composition.

Advantageously, the lubricant composition of the invention may comprise at least one antioxidant additive.

An antioxidant additive generally allows delayed degradation of the lubricant composition when in use. This degradation may notably translate as the formation of deposits through the presence of sludge, or an increase in the viscosity of the lubricant composition.

Antioxidant additives particularly act as radical inhibitors or hydroperoxide decomposers. Among the antioxidant additives frequently employed, mention can be made of antioxidant additives of phenolic type, antioxidant additives of amine type, sulfur-phosphorus antioxidant additives. Some of these antioxidant additives e.g. sulfur-phosphorus antioxidant additives may generate ash. Phenolic antioxidant additives can be ashless or can be in the form of neutral or basic metal salts. The antioxidant additives can be selected in particular from among sterically hindered phenols, sterically hindered phenol esters, and sterically hindered phenols comprising a thioether bridge, diphenylamines, diphenylamines substituted by at least one $C_1$-$C_{12}$ alkyl group, N,N'-dialkyl-aryl-diamines, and mixtures thereof.

Preferably, in the invention, the sterically hindered phenols are selected from among compounds comprising a phenol group in which at least one vicinal carbon of the carbon carrying the alcohol function is substituted by at least one $C_1$-$C_{10}$ alky group, preferably a $C_1$-$C_6$ alkyl group, more preferably a $C_4$ alkyl group, preferably by the tert-butyl group.

Amine compounds are another class of antioxidant additives that can be used, optionally in combination with phenolic antioxidant additives. Examples of amine compounds are the aromatic amines e.g. the aromatic amines of formula $NR^aR^bR^c$ where Ra is an aliphatic group or aromatic group, optionally substituted, $R^b$ is an optionally substituted, aromatic group, $R^c$ is a hydrogen atom, an alkyl group, an aryl group or group of formula $R^dS(O)_zR^e$ where $R^d$ is an alkylene group or alkenylene group, $R^e$ is an alkyl group, an alkenyl group or an aryl group and z is 0, 1 or 2.

Sulfurized alkyl phenols or the alkali or alkaline-earth metal salts thereof can also be used as antioxidant additives.

Another class of antioxidant additives is that of copper compounds e.g. copper thio- or dithio-phosphates, copper and carboxylic acid salts, copper dithiocarbamates, sulfonates, phenates and acetylacetonates. Copper I and II salts, the salts of succinic acid or anhydride can also be used.

The lubricant composition in the invention may contain any type of antioxidant additives known to persons skilled in the art.

Advantageously, the lubricant composition comprises at least one ash-free antioxidant additive.

Also advantageously, the lubricant composition of the invention comprises from 0.1 to 2% by weight of at least one antioxidant additive relative to the total weight of the composition.

The lubricant composition of the invention may also comprise at least one detergent additive.

Detergent additives generally allow a reduction in the formation of deposits on the surface of metal parts by dissolving secondary oxidation and combustion products.

The detergent additives able to be used in the lubricant composition of the invention are generally known to skilled persons. The detergent additives can be anionic compounds comprising a long lipophilic hydrocarbon chain and hydrophilic head. The associated cation can be a metal cation of an alkali or alkaline-earth metal.

The detergent additives are preferably selected from among alkali metal or alkaline-earth metal salts of carboxylic acids, sulfonates, salicylates, naphthenates, and phenate salts. The alkali and alkaline-earth metals are preferably calcium, magnesium, sodium, or barium.

These metal salts generally comprise the metal in stoichiometric amount or else in excess i.e. an amount greater than the stoichiometric amount. They are then overbased detergent additives; the excess metal imparting the overbased nature to the detergent additive is then generally in the form of an oil-insoluble metal salt e.g. a carbonate, hydroxide, oxalate, acetate, glutamate, preferably a carbonate.

Advantageously, the lubricant composition of the invention may comprise from 0.5 to 8%, or from 2 to 4% by weight of detergent additive relative to the total weight of the lubricant composition.

Also advantageously, the lubricant composition of the invention may comprise at least one pour point depressant additive.

By slowing the formation of paraffin crystals, pour point depressants generally improve the cold start behaviour of the lubricant composition of the invention.

As examples of pour point depressant additives, mention can be made of alkyl polymethacrylates, polyacrylates, polyarylamides, polyalkylphenols, polyalkylnaphthalenes, alkylated polystyrenes.

The present invention concerns a method for lubricating a rechargeable hybrid vehicle engine or a hybrid vehicle engine comprising a range extender, comprising the placing in contact of at least one mechanical part of the engine with a lubricant composition of grade 0W-8 according to the SAEJ300 classification, and comprising at least one base oil, at least one friction-modifying additive, from 0.1 to 10% by weight of at least one polymer improving the viscosity index, the lubricant composition having a KV40 lower than 20 mm$^2$/s, a KV100 lower than 5 mm$^2$/s and Noack volatility at 250° C. of between 10 and 85%, preferably between 25 and 85%, more preferably between 60 and 85%.

The lubricant composition is preferably as defined above.

The present invention also concerns a method for reducing the fuel consumption of a rechargeable hybrid vehicle or a hybrid vehicle comprising a range extender, which comprises the placing in contact of at least one mechanical part of the engine with a lubricant composition of grade 0W-8 according to the SAEJ300 classification, and comprising at least one base oil, at least one friction modifying additive, from 0.1 to 10% by weight of at least one polymer improving the viscosity index, the lubricant composition having a KV40 lower than or equal to 20 mm$^2$/s, a KV100 lower than 5 mm$^2$/s and Noack volatility at 250° C. of between 10 and 85%, preferably between 25 and 85%, more preferably between 60 and 85%.

The composition is preferably such as described above.

BRIEF DESCRIPTION OF THE DRAWING

The present invention will be described below with the aid of the following examples that are by no means limiting.

FIG. 1 shows the trend in engine speed (right-side axis in rpm) and temperature of the lubricant (left-side axis in ° C.) during a WLTC test.

DETAILED DESCRIPTION

Example 1: Compositions of the Invention and Comparative Compositions

The lubricant compositions below (CC comparative composition; CL composition of the invention) were prepared.

TABLE 2

| Composition | CC1 | CC2 | CC3 | CC4 | CL1 | CL2 | CL3 |
|---|---|---|---|---|---|---|---|
| Grade | 0W-8 | 0W-8 | 0W-16 | 0W-12 | 0W-8 | 0W-8 | 0W-8 |
| Additive package (wt. %) | 10.1 (including 3.8% dispersant) | 10.1 (including 3.8% dispersant) | 10.1 (including 3.8% dispersant) | 10.1 (including 3.8% dispersant) | 10.1 (including 3.8% dispersant) | 5 (including 1.9% dispersant) | 10.1 (including 3.8% dispersant) |
| Viscosity modifier (wt. %) | | | 4.1 | 1.6 | 5 | 5 | 3.3 |
| MoDTC (wt. %) | 0.5 | | | | 0.5 | 0.5 | 0.5 |
| Base oil 1 (wt. %) | 5 | 5 | | | | | |
| Base oil 2 (wt. %) | 84.4 | 84.9 | 85.8 | 88.3 | | | |
| Base oil 3 (wt. %) | | | | | 88.4 | 89.5 | 76.1 |
| Base oil 4 in Group III (wt. %) | | | | | | | 10 |
| HTHS 100° C. CEC L-036-90 or ASTM D4683 | | 3.87 | | | 2.9 | 2.58 | 3.10 |
| HTHS 150° C. CEC L-036-90 or ASTM D4683 | 1.8 | 1.8 | 2.28 | 2.02 | 1.69 | 1.50 | 1.66 |
| KV40 ASTM D445-97 (mm$^2$/s) | 23.66 | 22.792 | 26.037 | 23.953 | 13.64 | 11.24 | 14.78 |
| KV100 ASTM D445-97 (mm$^2$/s) | 5.039 | 5.01 | 6.233 | 5.474 | 4.578 | 4.058 | 4.367 |
| VI | 146 | | | | 300 | | |
| BOV | 4.1 | 4.1 | 4.1 | 4.1 | 2 | 2 | 2 |
| Estimated Noack 250 (%) ASTM D5800 or CEC L-040-93 | 13.5 | 13.5 | <13 | <13 | 78 | 78 | 68 |

TABLE 2-continued

| Composition | CC1 | CC2 | CC3 | CC4 | CL1 | CL2 | CL3 |
|---|---|---|---|---|---|---|---|
| Estimated Noack 200 (%) ASTM D5800 or CEC L-040-93 | 2 | 2 | <2 | <2 | 30 | 30 | 30 |

Example 2: WLTC Cycle Savings in Consumption

The compositions in Example 1 were subjected to simulation for hybrid application under the WLTC test (or WLTP—Worldwide Harmonized Light Vehicles Test Procedure) to determine the savings in fuel consumption.

In this respect, friction tests (FMEP=Friction Mean Effective Pressure) of the different lubricant compositions described in Example 1 were conducted on a test bed comprising a driven Nissan X-Trail MR20 engine, having a power of 108 KW at 5600 rpm, driven by an electric generator producing a rotation speed of between 550 and 2800 rpm, whilst a torque sensor allowed measurement of the friction torque generated by the movement of the engine parts. The friction torque induced by the lubricant composition to be tested was compared, for each engine speed and for each mean torque at each temperature, with that induced by the reference lubricant composition (SAE 0W16) which was evaluated before and after each of the lubricant compositions to be tested.

The higher the value of the reduction in friction torque, the more the lubricant composition can allow friction occurring in the engine to be reduced.

The conditions of this test were the following.
The tests were conducted in the following sequence:
rinsing the engine with a detergent additive for lubricant oil comprising one rinsing, followed by two rinsings with a reference lubricant composition of grade 0W-12 comprising 81.7% by weight of base oil, 17.8% by weight of usual additives (4.4% viscosity index improver, 0.5% antioxidant, 0.20% pour point depressant and 12.7% additive package) and 0.05% by weight of molybdenum dithiocarbamate (MoDTC), relative to the total weight of the base oil;
measuring the friction torque at the two different temperatures indicated below on the engine using the reference lubricant composition;
rinsing the engine with a detergent additive for lubricant oil comprising one rinsing, followed by two rinsings with a lubricant composition to be evaluated;
measuring the friction torque at the two different temperatures on the engine using the lubricant composition to be evaluated;
rinsing the engine with a detergent additive for lubricant oil comprising one rinsing, followed by two rinsings with the reference lubricant composition; and
measuring the friction torque at the two different temperatures indicated below on the engine using the reference lubricant composition.

The speed ranges, variation in speed and temperature were chosen in agreement with Nissan, to be representative of the WLTC cycle.

The instructions followed were:
Temperature of water leaving the engine: 30° C./50° C./80° C.+/−0.5° C.
Petrol temperature ramp: 50° C./80° C.+/−0.5° C.

The results are given in following Table 3 and show the reduction in friction expressed as % (compared with the Nissan Strong Save X 0W-16 oil, used as reference oil and point of comparison for this part of the test) as a function of engine speed and temperature for the compositions in Example 1.

TABLE 3

|  | 550 | 650 | 800 | 1000 | 1200 | 1400 | 1600 | 1800 | 2000 | 2400 | 2800 |
|---|---|---|---|---|---|---|---|---|---|---|---|
| | | | | | | CC3 | | | | | | |
| 30 | 0.197 | 0.247 | 0.331 | 0.382 | 0.393 | 0.454 | 0.423 | 0.405 | 0.300 | 0.443 | 0.647 |
| 50 | −0.074 | 0.026 | 0.087 | 0.133 | 0.235 | 0.304 | 0.358 | 0.408 | 0.379 | 0.430 | 0.435 |
| 80 | −0.860 | −0.702 | −0.601 | −0.341 | −0.232 | −0.158 | −0.036 | −0.046 | −0.003 | 0.04 | 0.135 |
| | | | | | | CC4 | | | | | | |
| 30 | 0.298 | 0.347 | 0.456 | 0.440 | 0.601 | 0.739 | 0.696 | 0.709 | 0.689 | 0.655 | 0.898 |
| 50 | 0.032 | 0.131 | 0.088 | 0.310 | 0.338 | 0.432 | 0.564 | 0.544 | 0.490 | 0.566 | 0.649 |
| 80 | −0.812 | −0.582 | −0.479 | −0.216 | −0.111 | −0.034 | 0.090 | 0.182 | 0.201 | 0.223 | 0.268 |
| | | | | | | CC2 | | | | | | |
| 30 | 0.399 | 0.474 | 0.669 | 0.708 | 0.802 | 0.979 | 0.917 | 0.865 | 0.868 | 0.950 | 1.074 |
| 50 | 0.042 | 0.143 | 0.195 | 0.419 | 0.445 | 0.618 | 0.654 | 0.636 | 0.613 | 0.796 | 0.853 |
| 80 | −0.866 | −0.636 | −0.437 | −0.081 | 0.119 | 0.094 | 0.118 | 0.265 | 0.263 | 0.283 | 0.321 |
| | | | | | | CC1 | | | | | | |
| 30 | 0.499 | 0.599 | 0.696 | 0.777 | 0.920 | 0.901 | 0.883 | 0.961 | 0.977 | 0.963 | 1.199 |
| 50 | 0.391 | 0.469 | 0.398 | 0.473 | 0.598 | 0.696 | 0.770 | 0.793 | 0.740 | 0.813 | 0.908 |
| 80 | 0.100 | 0.172 | 0.168 | 0.365 | 0.367 | 0.317 | 0.392 | 0.467 | 0.563 | 0.512 | 0.552 |
| | | | | | | CL3 | | | | | | |
| 30 | 1.745 | 1.931 | 2.199 | 2.430 | 2.928 | 3.423 | 3.640 | 3.658 | 3.644 | 3.684 | 4.096 |
| 50 | 0.726 | 0.948 | 1.210 | 1.515 | 1.719 | 2.007 | 2.290 | 2.473 | 2.450 | 2.592 | 2.866 |
| 80 | −0.292 | −0.052 | 0.173 | 0.498 | 0.691 | 0.921 | 0.969 | 1.054 | 1.199 | 1.390 | 1.434 |

TABLE 3-continued

| | 550 | 650 | 800 | 1000 | 1200 | 1400 | 1600 | 1800 | 2000 | 2400 | 2800 |
|---|---|---|---|---|---|---|---|---|---|---|---|
| | | | | | | CL2 | | | | | |
| 30 | 2.348 | 2.635 | 2.918 | 3.368 | 3.930 | 4.588 | 4.806 | 4.960 | 4.900 | 5.042 | 5.447 |
| 50 | 1.156 | 1.482 | 1.831 | 2.141 | 2.337 | 2.627 | 2.923 | 3.107 | 3.174 | 3.372 | 3.650 |
| 80 | 0.081 | 0.295 | 0.433 | 0.845 | 0.972 | 1.246 | 1.295 | 1.397 | 1.473 | 1.444 | 1.346 |
| | | | | | | CL1 | | | | | |
| 30 | 1.901 | 2.201 | 2.479 | 2.853 | 3.399 | 3.982 | 4.088 | 4.105 | 4.158 | 4.338 | 4.288 |
| 50 | 0.813 | 1.064 | 1.393 | 1.706 | 1.857 | 2.160 | 2.314 | 2.569 | 2.508 | 2.630 | 2.833 |
| 80 | −0.027 | 0.177 | 0.410 | 0.689 | 0.843 | 0.962 | 1.039 | 1.194 | 1.152 | 1.152 | 1.162 |

In parallel, a WLTC test on a vehicle having the same engine as the one mentioned at the preceding step was also conducted for tangible measurement of fuel consumption and oil temperature throughout said cycle. This driving test was conducted with a single reference lubricant, the same as the one used to establish the reference for the PMF tests described above: Nissan Strong Save X 0W16 oil according to graph in FIG. 1.

Therefore, oil temperatures and levels of fuel consumption were measured under the WLTC cycle on a Nissan X-Trail MR20 engine. Different power levels of electrical assistance were considered from 1 kW up to 35 KW (representing several types of hybridization).

In this respect, powers of 1 or 2 KW represent electrical assistance of light hybridization types (Micro-Hybrid and Mild-Hybrid respectively).

A power of 5 KW represents the electrical assistance of a Full-Hybrid vehicle.

Finally, powers of 18 or 33 KW represent electrical assistance of the most advanced hybridization types (Range Extender and rechargeable (Plug-In) Hybrid respectively).

Next, simulation of oil temperature and fuel consumption was carried out for the different types of hybrid vehicles concerned, as a function of the types of hybridization described above, and considering that the internal combustion engine is shut off when power demand is lower than the available level of electrical power. These simulations were conducted for the lubricant compositions such as described in Example 1, and for which results in terms of coefficient of friction were already known.

Finally, the simulated oil temperature was projected (by linear interpolation of friction results) and the advantage or penalty obtained (results of the coefficients of friction obtained) was applied to fuel consumption. Fuel consumption was only taken into account when the engine was running.

Each trace line of simulated oil temperature was transposed by linear interpolation of FTT FE [=f(T ° C.) & engine speed (rpm)] results, and the advantage/penalty ratio was applied to the corresponding point of fuel consumption. The fuel consumption trace was then integrated to obtain levels of overall Fuel Economy performance which can be compared and are comparable.

The following results were obtained and show the fuel savings when the engine was lubricated with the compositions in Example 1.

TABLE 4

| | | Fuel savings (%) | | | | | |
|---|---|---|---|---|---|---|---|
| Composition | Dispersant % | Non-hybrid | Micro-hybrid | Mild-Hybrid | Full-hybrid | Range Extender | Plug-In Hybrid |
| CC4 | 3.8 | 0.18 | 0.30 | 0.34 | 0.38 | 0.48 | 0.53 |
| CC3 | 3.8 | 0.03 | 0.13 | 0.17 | 0.21 | 0.31 | 0.37 |
| CL2 | 1.9 | 1.58 | 2.13 | 2.33 | 2.52 | 3.04 | 3.23 |
| CL1 | 3.8 | 1.30 | 1.75 | 1.91 | 2.08 | 2.47 | 2.56 |
| CC1 | 3.8 | 0.46 | 0.59 | 0.63 | 0.66 | 0.68 | 0.71 |
| CC2 | 3.8 | 0.27 | 0.41 | 0.45 | 0.50 | 0.63 | 0.65 |
| CL3 | 3.8 | 1.27 | 1.69 | 1.85 | 2.00 | 2.33 | 2.44 |
| T° C. of the lubricant composition | | 71.7 | 60.7 | 56.7 | 52.5 | 34.1 | 25.3 |

The results in Table 4 show that the compositions of the invention allow major fuel savings for the rechargeable hybrid systems (plug-in hybrids) and hybrids comprising a range extender. On the contrary, these same compositions of the invention do not allow a substantial reduction in the other types of hybrid motorization. These results show that the compositions of the invention are specifically efficient for rechargeable hybrid motorizations and for hybrid motorizations comprising a range extender.

Additionally, the mean temperature of the lubricant was extrapolated and is higher than 70° C. for a non-hybrid vehicle engine, higher than 60° C. for a micro-hybrid vehicle, higher than 55° C. for a mild-hybrid vehicle, higher than 50° C. for a full-hybrid vehicle, and is lower than 40° C. for hybrid vehicles comprising a range extender and for rechargeable hybrid vehicles.

The invention claimed is:

1. A method for lubricating a rechargeable hybrid vehicle engine or a hybrid vehicle engine comprising a range extender, comprising contacting at least one mechanical part of the engine with a lubricant composition of grade 0W-8 according to the SAEJ300 classification, comprising at least one base oil, at least one friction modifying additive, from 0.1 to 10% by weight of at least one polymer improving the viscosity index, the lubricant composition having a kinematic viscosity measured at 40°° C. according to standard ASTM D445 lower than 20 mm2/s, a kinematic viscosity measured at 100° C. according to standard ASTM D445 lower than 5 mm2/s, and a Noack volatility measured at 250° C. according to standard CEC-L-40-A-93 of between 25% and 85%.

2. The method of claim 1, wherein the base oil has a kinematic viscosity measured at 40° C., according to standard ASTM D445, of less than 15 mm$^2$/s.

3. The method of claim 1, wherein the base oil has a kinematic viscosity measured at 100° C., according to standard ASTM D445, of between 1 and 4 mm$^2$/s.

4. The method of claim 1, wherein the lubricant composition comprises between 0.5 and 4.0% by weight of dispersant, relative to the total weight of the lubricant composition.

5. The method according to claim 1, wherein the kinematic viscosity measured at 40° C., according to standard ASTM D445, is between 10 and 20 mm$^2$/s.

6. The method according to claim 1, wherein the kinematic viscosity measured at 100° C., according to standard ASTM D445, of the lubricant composition is between 1 and 5 mm$^2$/s.

7. The method according to claim 1, wherein the lubricant composition comprises from 50 to 95% by weight of base oil, relative to the total weight of the lubricant composition.

8. The method according to claim 1, wherein the lubricant composition comprises from 0.01 to 10% by weight of friction modifying additive, relative to the total weight of the lubricant composition.

9. The method according to claim 1, wherein the friction modifying additive is molybdenum-based.

10. A method for reducing the fuel consumption of a rechargeable hybrid vehicle or hybrid vehicle comprising a range extender, comprising contacting at least one mechanical part of the engine with a lubricant composition of grade OW-8, according to the SAEJ300 classification, comprising at least one base oil, at least one friction modifying additive, from 0.1 to 10% by weight of at least one polymer improving the viscosity index, the lubricant composition having a kinematic viscosity measured at 40° C. according to standard ASTM D445 lower than 20 mm$^2$/s, a kinematic viscosity measured at 100° C. according to standard ASTM D445 lower than 5 mm$^2$/s, and a Noack volatility measured at 250° C. according to standard CEC-L-40-A-93 of between 25% and 85%.

11. The method of claim 10, wherein the base oil has a kinematic viscosity measured at 40° C., according to standard ASTM D445, of less than 15 mm$^2$/s.

12. The method of claim 10, wherein the base oil has a kinematic viscosity measured at 100° C., according to standard ASTM D445, of between 1 and 4mm$^2$/s.

13. The method of claim 10, wherein the lubricant composition comprises between 0.5 and 4.0% by weight of dispersant, relative to the total weight of the lubricant composition.

14. The method according to claim 10, wherein the kinematic viscosity measured at 40° C., according to standard ASTM D445, is between 10 and 20 mm$^2$/s.

15. The method according to claim 10, wherein the kinematic viscosity measured at 100° C., according to standard ASTM D445, of the lubricant composition is between 1 and 5 mm$^2$/s.

16. The method according to claim 10, wherein the lubricant composition comprises from 50 to 95% by weight of base oil, relative to the total weight of the lubricant composition.

17. The method according to claim 10, wherein the lubricant composition comprises from 0.01 to 10% by weight of friction modifying additive, relative to the total weight of the lubricant composition.

18. The method according to claim 10, wherein the friction modifying additive is molybdenum-based.

* * * * *